United States Patent [19]
Hile

[11] 4,389,853
[45] Jun. 28, 1983

[54] METHOD AND APPARATUS FOR CONTROLLING AN AIR CONDITIONING UNIT WITH MULTI-SPEED FAN AND ECONOMIZER

[75] Inventor: James R. Hile, Kirkville, N.Y.

[73] Assignee: Carrier Corporation, Syracuse, N.Y.

[21] Appl. No.: 293,057

[22] Filed: Aug. 17, 1981

[51] Int. Cl.³ .................................... F25D 17/06
[52] U.S. Cl. .................................. 62/89; 62/180;
165/16; 236/49
[58] Field of Search ............ 236/49, 1 EA, DIG. 9;
165/16; 62/180, 89, 332, 410

[56] References Cited

U.S. PATENT DOCUMENTS

| | | |
|---|---|---|
| 3,034,314 | 5/1962 | Canter. |
| 3,853,174 | 12/1974 | Kramer. |
| 3,877,243 | 4/1975 | Kramer. |
| 3,959,979 | 6/1976 | Kramer. |
| 4,041,723 | 8/1977 | Weibel, Jr. et al. |
| 4,078,393 | 3/1978 | Wills. |
| 4,186,564 | 2/1980 | Myers. |
| 4,209,995 | 7/1980 | Ferdelman. |
| 4,267,967 | 5/1981 | Beck et al. ............................ 236/49 |
| 4,347,712 | 9/1982 | Benton et al. ................... 236/49 X |

OTHER PUBLICATIONS

Honeywell Pamphlet—W973 Solid State Energy Management System.

*Primary Examiner*—William E. Wayner
*Attorney, Agent, or Firm*—Donald F. Daley; Robert P. Hayter

[57] ABSTRACT

An apparatus and method for operating an air conditioning unit incorporating both an economizer and a two speed fan are described. When the economizer is in operation the fan is typically operated at high speed regardless of refrigeration circuit operation to circulate sufficient outdoor air to the enclosure. When the economizer is closed, indicating the outdoor air is too warm to provide cooling to the enclosure, the fan is typically operated at low speed saving fan energy. An override control is provided for operating the fan at high speed regardless of the outdoor temperature should sufficient cooling demand be detected.

13 Claims, 2 Drawing Figures

METHOD AND APPARATUS FOR CONTROLLING AN AIR CONDITIONING UNIT WITH MULTI-SPEED FAN AND ECONOMIZER

BACKGROUND OF THE INVENTION

1. Field of the Invention

The present invention concerns a fan control for air conditioning units. More particularly, the herein described invention pertains to an economical control for a multi-speed fan for use in an air conditioning unit including an economizer.

2. Prior Art

Since the rise in the cost of energy, commercial structures, office buildings and retail stores, and other large air handling equipment users have investigated methods of saving energy relative to fan energy consumed in circulating air. Air handling requirements of an air conditioning system are designed to meet the highest requirements of the load or structure. Since the greatest power demand for cooling often occurs during the summer the air handling system must be designed for maximum summer conditions. Thus, during most of the year, the flow of conditioned air through the air handling units may be much greater than necessary. This increased capacity requires a greater initial equipment investment and potentially increased maintenance costs over the operating lift of the system. The operation of the air handling unit at higher capacity then necessary consumes considerable energy in powering fans and may add to the overall cooling load if the fan motor is located in the area cooled.

One method of decreasing air handling energy consumption at less than peak demand is to install load shedding equipment to cycle various air handling devices. Load shedding systems, however, involve motor and belt wear due to frequent cycling and uneven air distribution based on which air handlers are energized. In order to avoid the problems of load shedding, multiple speed fans have been used as an energy reduction device. By operating a system with multiple speed fans it is possible to match the volume of air being circulated with the air conditioning load.

It has been found advantageous to utilize air conditioning systems with economizers. The economizer as used herein is incorporated into an air conditioning unit to allow outdoor ambient air to be drawn into the unit for circulation to the enclosure. It is desirable to circulate outdoor air to the enclosure when its temperature and humidity are such that cooling of the enclosure may be accomplished without operating the refrigeration circuit of the air conditioning unit. The utilization of an economizer requires that sufficient air be circulated such that the air being drawn into the unit through the economizer is circulated to the enclosure and a sufficient volume of air is circulated back to the air conditioning unit. Under some conditions a power exhaust fan, return air fan or a discharge opening may be utilized such that the return air from the enclosure is discharged to the ambient. Hence, any cooling created in this mode of operation is the substitution of cool outdoor ambient air for the existing indoor air.

The present described invention concerns a rooftop type air conditioning unit having an economizer for drawing ambient air into the enclosure when appropriate. The herein invention also includes a multiple speed fan. To optimize energy consumption the fan is operated at high speed whenever ambient air is of sufficiently low temperature to provide cooling to the enclosure even though it is necessary to simultaneously operate refrigeration circuits to effect additional cooling. The fan is operated at low speed saving fan energy when the outdoor ambient temperature is high and the return air from the enclosure to the unit is being reconditioned by operation of the refrigeration circuits and recirculated to the enclosure.

When the temperature differential between the desired temperature and the temperature of the enclosure reaches a predetermined level an override is provided to operate the fan at high speed regardless of the economizer position or temperature of the outdoor air.

SUMMARY OF THE INVENTION

It is an object of the present invention to provide a control for an air conditioning unit.

It is a further object of the present invention to provide a method of operating an air conditioning unit having both an economizer and a multiple speed fan.

It is a further object of the present invention to provide a control method capable of saving energy in an air conditioning unit by operating an indoor fan at an appropriate fan speed depending upon the mode of operation of the air conditioning unit as well as the availability of cooler ambient air and the load on the unit.

It is another object of the present invention to provide a safe, efficient and reliable control for operating an air conditioning unit.

Further objects will be apparent from the description to follow and the appended claims.

The above objects are achieved according to a preferred embodiment of the invention by controlling the operation of an air conditioning unit including an adjustable volume air handling means such as a two speed fan for supplying air to an enclosure to be conditioned. Additionally, an economizer having adjustable dampers is provided with the air conditioning unit for regulating the flow of outdoor ambient air to the enclosure. The temperature of the enclosure to be conditioned is sensed and a signal is generated indicative of the difference between the desired temperature of the enclosure and the actual temperature sensed. Additionally, ambient air conditions are sensed and the dampers of the economizer are positioned to allow ambient air to enter the unit when the conditions warrant such that outdoor air may be circulated to the enclosure to effect cooling thereof. The air handling means is energized at a reduced volume flow rate when the conditions do not warrant economizer operation. The air handling means is energized at an increased volume flow rate when the conditions do warrant economizer operation and outdoor ambient air is circulated to the enclosure. Additionally, an override may be included in the method of operation such that whenever the desired temperature exceeds a certain level from the actual temperature sensed the air handling means may be operated at the increased volume flow rate.

DETAILED DESCRIPTION OF THE PREFERRED EMBODIMENT

The air conditioning unit described herein will be a two compressor rooftop type unit. It is to be understood that the apparatus and method as described herein are applicable to other types of air conditioning units and are not limited in structure or method to the specific embodiments set forth.

As detailed herein a microprocessor control will be utilized to effect switching between fan speeds and various compressor operations. It is to be understood although a microprocessor control is described herein, numerous other types of devices could achieve the same result. A series of electrical contacts preset to close at different temperature conditions, a mechanical device having separate sensing elements or other apparatus could achieve the same switching operation as set forth in the description and as presently available in the microprocessor control.

Figure 1:
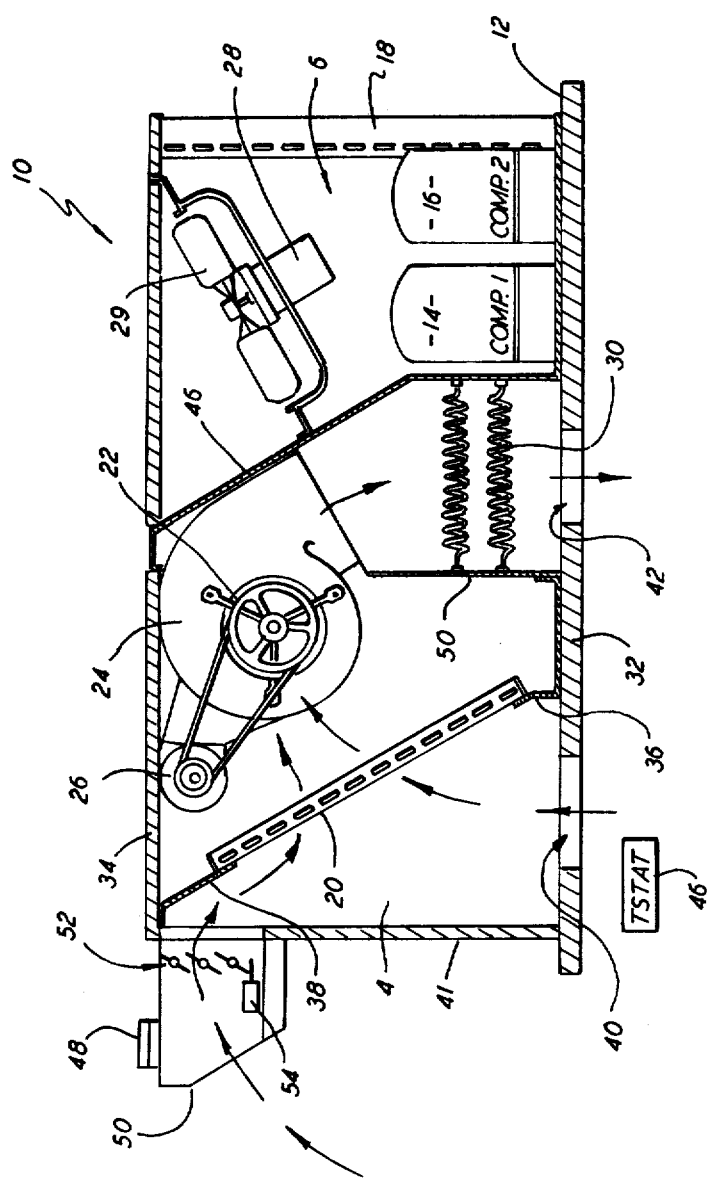
FIG. 1 is a schematic view of a rooftop type air conditioning unit.

Referring now to FIG. 1, there can be seen an air conditioning unit 10 which is designed to be mounted to the rooftop of an enclosure to be conditioned. This air conditioning unit is divided by partition 46 into an indoor section 4 and outdoor section 6. Compressors referenced by numerals 14 and 16 are located in the outdoor section of the unit. Additionally, condenser 18 and condenser fan 29 powered by condenser fan motor 28 are located in the outdoor section of the unit.

The indoor section 4 of the unit includes an evaporator 20, supply fan motor 26, supply fan scroll 24, supply fan 22 and electric heaters 30. Coil supports 36 and 38 are shown for supporting evaporator 20. The supply fan is a centrifugal or squirrel cage type fan mounted for rotational movement on a bearing system and is driven by a pulley system through supply fan motor 26. The indoor air flow, as shown in FIG. 1, is upwardly through return air opening 40 through evaporator 20 into the fan scroll. Air is discharged from fan 22 downwardly through electric heaters 30 and through the supply air opening back to the enclosure.

Economizer 50 is shown mounted to a portion of indoor air section 4. Dampers 52 are mounted for rotational movement and are driven by economizer motor 54 such that they may be positioned to either allow or prevent ambient air flow into the indoor section of the unit. Outdoor condition sensor 48 and thermostat 46 are both shown.

Figure 2:
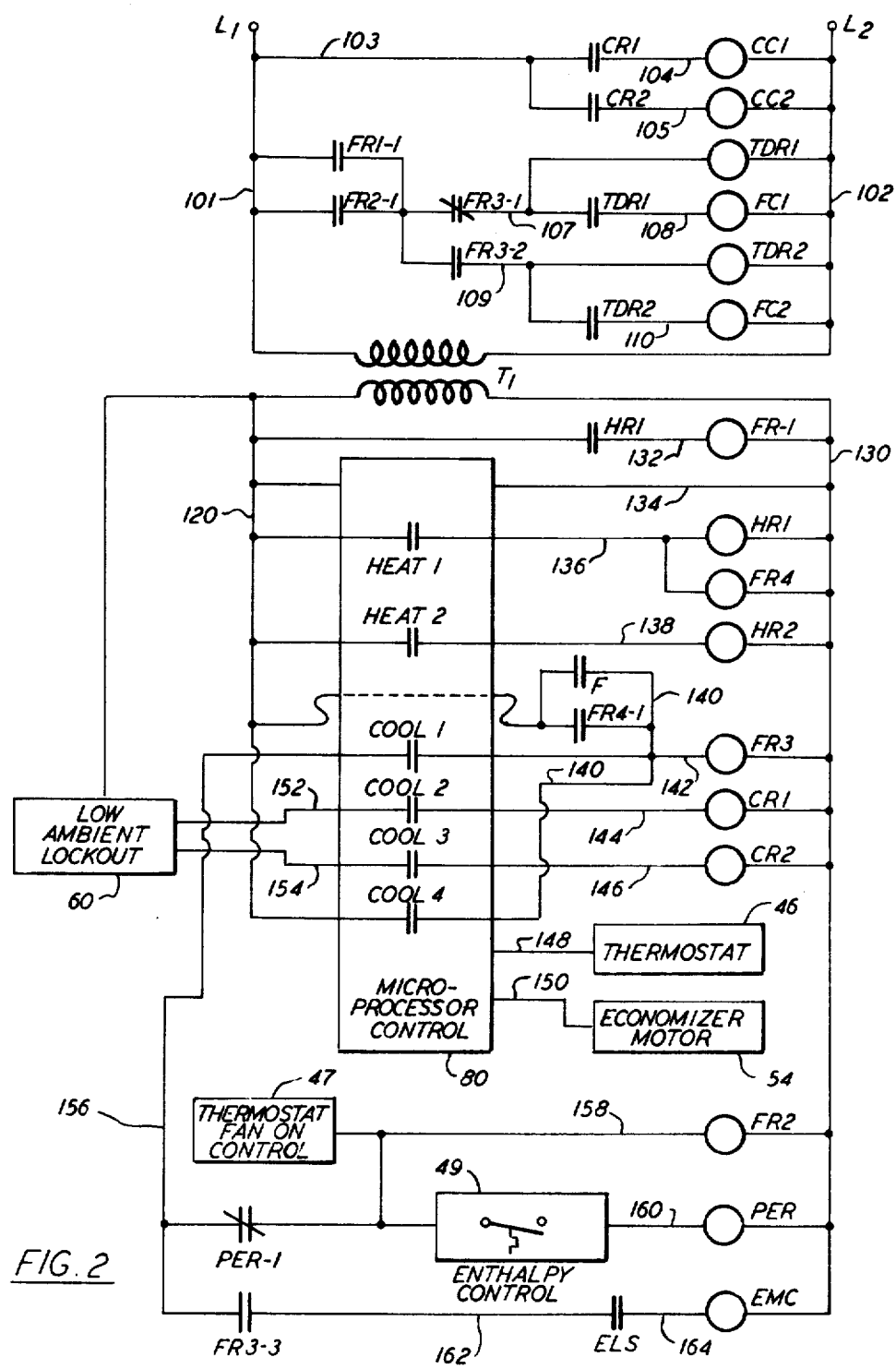
FIG. 2 is a partial wiring schematic of a control for use with an air conditioning unit.

Referring to FIG. 2, there may be seen a partial wiring schematic for an air conditioning unit. As shown therein, power is supplied between lines L-1 and L-2 through wires 101 and 102. Wire 101 is connected to fan relay FR1-1 normally open contacts and to fan relay FR2-1 normally open contacts. Wire 106 connects fan relay FR1-1 contacts with fan relay FR2-1 contacts, fan relay FR3-1 normally closed contacts and fan relay FR3-2 normally open contacts. Wire 107 connects normally closed fan relay FR3-1 contacts with time delay relay TDR-1 and the time delay relay TDR-1 contacts. Wire 108 connects the time delay relay TDR-1 contacts with the low speed fan contactor FC-1.

Wire 109 connects the fan relay FR3-2 contacts with time delay relay TDR-2 and time delay relay normally open contacts TDR-2. Wire 110 connects the normally open time delay relay contacts TDR-2 with high speed fan contactor FC-2. A winding of transformer T-1 is connected between wires 101 and 102. The portion of the circuit just described is the power portion of the circuit and is typically operated at 115 volts. Although various contactors have been shown the remaining elements such as compressor motors, indoor and outdoor fan motors, reversing valve solenoids and other elements that may be typically incorporated in the unit have not been included herein since they have no direct bearing on the invention set forth.

In the control portion of the wiring schematic, power is supplied between the wires 120 and 130 through a winding of transformer T-1. Microprocessor control 80 has a series of six contacts contained therein, these contacts being normally open such that upon the receipt of the appropriate signal they are closed. These six contacts are labeled Heat 1, Heat 2, Cool 1, Cool 2, Cool 3 and Cool 4.

Wire 120 connects transformer T-1 to low ambient lockout 60, heating relay contacts HR-1, to microprocessor control 80 and through the microprocessor control to switches Heat 1, Heat 2 and Cool 4. Low ambient lockout 60 is connected via line 152 to the Cool 2 switch of the microprocessor control. The low ambient lockout is also connected by wire 154 to the Cool 3 switch of microprocessor control 80.

Microprocessor control 80 is supplied with power via connections by line 120 to one side of transformer T-1 and via lines 134 and 130 to the other side of transformer T-1.

Heating relay contacts HR-1 are connected by wire 132 to fan relay FR-1 which is connected to wire 130. The Heat 1 switch of the microprocessor control is connected by wire 136 to heating relay HR-1 and fan relay FR-4. The Heat 2 switch of the microprocessor control is connected by wire 138 to heating relay HR-2. The Cool 1 switch of the microprocessor control is connected by wire 142 to fan relay FR-3. The Cool 1 switch is also connected by wire 140 to the Cool 4 switch of the microprocessor control and to the normally open fan relay contacts FR4-1 and to the normally open freezestat contacts F.

Wire 144 connects the normally open switch Cool 2 of the microprocessor to compressor relay CR-1. The Cool 3 switch of the microprocessor control is connected by wire 146 to the second compressor relay CR-2. Wire 148 connects thermostat 46 to the microprocessor control and wire 150 connects economizer motor 54 to the microprocessor control.

Fan control 47, a portion of thermostat 46, is connected by wire 158 to fan relay FR-2 to enthalpy control 49 and to the normally closed power exhaust relay contacts PER-1. Wire 160 connects the enthalpy control to power exhaust relay PER. Wire 156 connects the normally closed power exhaust relay contacts PER-1 to the Cool 1 switch of the microprocessor control and to normally open fan relay contacts FR3-3. Wire 130 connects one side of transformer T-1 to fan relay FR-1, heating relay HR-1, fan relay FR-4, heating relay HR-2, fan relay FR-3, first compressor relay CR-1, second compressor relay CR-2, fan relay FR-2, power exhaust relay PER and to exhaust motor contactor EMC. Wire 162 connects fan relay contacts FR3-3 to economizer limit switch ELS which is connected by wire 164 to exhaust motor contactor EMC.

Operation

A refrigeration circuit of an air cooled air conditioning unit is normally utilized to transfer heat energy between the indoor air and outdoor air. The supply fan circulates air from the space to be conditioned through the indoor coil or evaporator 20 herein then returns said air to the space to to be conditioned through supply air opening 42. When the outdoor air temperature is sufficiently cool, air is drawn by supply fan 22 through the economizer through dampers 52 into the unit and then circulated to the space to be conditioned. When the economizer is operating air may be discharged from the enclosure by an exhaust fan or other device not shown.

When the air conditioning unit is in the cooling mode of operation the thermostat 46, including fan on control 47, signals the unit to become energized. Typically, a building is programmed to turn the air conditioning on in the morning prior to the building occupancy. At this time power is supplied through wire 158 to fan relay FR-2 which acts to close fan relay contacts FR2-1 completing the circuit to time delay relay TDR-1. After a short time interval contacts TDR-1 close energizing fan contactor FC-1 through wires 101, 106, 107 and 108 thereby operating the fan at low speed. The actual fan contactors and fan motors are not shown. The unit operates with the fan circulating air for ventilation purposes at low speed at all times the unit is energized. Thermostat 46 senses the temperature of the air in the enclosure and compares that temperature to a setpoint. Thermostat 46 is designed to generate an increasing signal as the variance between the setpoint and the desired temperature increases. This increasing signal is allowed to close switches Cool 1, Cool 2, Cool 3 and Cool 4 in successive order as the variance from the setpoint increases.

Enthalpy control 49 senses the temperature and potentially the humidity of the ambient air and determines whether or not the ambient air may be circulated to othe enclosure to effect cooling. The microprocessor control based upon a signal from the thermostat acts to effect switching if a cooling demand is present. Upon the thermostat sensing a first stage cooling demand switch Cool 1 is closed. If the enthalpy control senses ambient air may be used for cooling then the enthalpy control does not energize power exhaust relay PER and normally closed power exhaust relay contacts PER-1 remain closed and power is supplied through wires 158 and 156 to switch Cool 1. When the thermostat senses the appropriate cooling load switch Cool 1 is closed and fan relay FR-3 is energized through wire 142. Normally closed fan relay contacts FR3-1 are opened and normally open fan relay contacts FR3-2 are closed. This allows the time delay relay TDR-2 to be energized through wire 109. Shortly thereafter time delay relay contacts TDR-2 are closed energizing fan contactor FC-2, the high speed contactor, through wire 110. Hence, under this particular condition the indoor fan is operated at high speed. Since normally closed fan relay contacts FR3-1 are now opened the fan cannot be operated at low speed.

Upon the thermostat sensing an additional cooling need switch Cool 2 will be closed energizing through wire 144 compressor relay CR-1. Compressor relay contacts CR-1 then close energizing compressor contactor CC-1 which acts to energize the first compressore thereby operating a refrigeration circuit. If the energization of this first refrigeration circuit still does not serve to meet the cooling load the thermostat, upon a further rise in temperature, will energize switch Cool 3 through which wire 146 energizes compressor relay CR-2 and consequently compressor contactor CC-2. At this point in time both refrigeration circuits are operating. Should the temperature still continue to rise then relay switch Cool 4 will be closed supplying power to the fan relay 3. However, since the unit is already operating with the fan at high speed this will have no effect.

During operation of the unit with the enthalpy control sensing cooling available in the ambient air, normally closed contacts PER-1 supply power to normally open fan relay contacts FR3-3. Since fan relay FR-3 is energized upon a cooling load being sensed fan relay contacts FR3-3 will close energizing an exhaust fan via exhaust motor contactor EMC. An economizer limit switch ECL is provided to close when the economizer is open to prevent operation of the exhaust fan if the economizer is closed.

If the air conditioning unit, when in the cooling mode, senses through enthalpy control 49 that the ambient air is at a high temperature and is not capable of being used to cool the enclosure then enthalpy control 49 energizes power exhaust relay PER. Power exhaust relay contacts PER-1 are opened and the potential source of power to switch Cool 1 and fan relay contacts FR3-3 is removed. Hence, with the economizer in the closed position the advent of a cooling load will result in switch Cool 1 being closed, however, the fan speed does not switch since there is no power supplied to the Cool 1 switch. Upon an increased cooling load being sensed, the Cool 2 switch will close energizing, through wire 144, compressor relay CR-1. Upon a further request for cooling the Cool 3 switch will close energizing compressor relay CR-2 through wire 146. During the operation of one or both compressors the fan speed has remained at low speed since fan relay FR-3 has not been energized. Should the temperature in the space continue to rise the Cool 4 switch will be closed. By closing the Cool 4 switch power is supplied through wire 140 to wire 142 energizing fan relay FR-3 thereby switching the fan speed from low to high.

In the heating mode of operation, heating relay HR-1 and fan relay FR-4 are energized once switch Heat 1 is closed by the thermostat sensing a heating need. Fan relay FR-4 acts to close fan relay contacts FR4-1 which connects power to fan relay FR-3 acting to switch the fan to the high speed mode of operation. Hence, upon a first stage heat demand being sensed the fan operates at high speed. Upon the second stage heat demand being sensed by thermostat 46 switch Heat 2 will close energizing, through wire 138, heating relay HR-2. While not shown, the heating relays will act to energize electric heaters 30 of the air conditioning unit to supply heat energy to the enclosure.

Low ambient lockout 60 prevents the compressors from being energized through compressor relays CR-1 and CR-2 when the outdoor ambient temperature is below a predetermined level.

Freeze contacts F are closed by a temperature sensing device when a potential freezeup problem at the indoor coil develops. The closing of freezeup contacts F energizes the fan at high speed through fan relay FR-3 to prevent ice formation by circulating a larger volume of indoor air per unit time.

The microprocessor control described herein is a commercially available control manufactured by Honeywell, Inc. of Minneapolis, Minn.

The invention has been described herein referenced to a particular embodiment. It is to be understood that modifications and variations can be made within the spirit and scope of this invention. It is also to be understood that although a microprocessor switching device

What is claimed is:

1. A method of controlling the operation of an air conditioning unit including an adjustable volume air handling means for supplying air to an enclosure to be conditioned and an economizer having adjustable dampers in addition to a refrigeration circuit which comprises the steps of:

sensing the temperature of the enclosure to be conditioned;

generating a signal indicative of the difference between the desired temperature for the enclosure and the temperature sensed;

sensing ambient air conditions;

positioning the dampers of the economizer to allow ambient air to enter the unit when the ambient air conditions warrant circulating outside air to the enclosure to effect cooling of the enclosure;

energizing the air handling means in response to the signal at a reduced volume flow rate if ambient air conditions do not warrant economizer operation; and energizing the air handling means in response to the signal at an increased volume flow rate if ambient air conditions warrant economizer operation.

2. The method as set forth in claim 1 and further including the step of energizing the air handling means at an increased volume flow rate whenever the signal indicative of the difference between the desired temperature for the enclosure and the temperatures sensed exceeds a predetermined level.

3. The method as set forth in claim 1 wherein the step of energizing the air handling means at a reduced volume occurs when the air conditioning unit is operated to remove heat energy from the enclosure air.

4. The method as set forth in claim 3 wherein when the step of positioning places the dampers in a fully open position the air handling means is energized at the increased volume flow rate.

5. The method as set forth in claim 1 wherein the air conditioning unit is capable of supplying heating as well as cooling to the enclosure and further comprising the step of:

energizing the air handling means at the increased volume flow rate whenever a heating need is sensed.

6. A method of controlling the indoor fan speed of an air conditioning unit including a supply fan powered by a multi-speed motor, an economizer for admitting ambient air into the enclosure, damper means for regulating ambient air flow through the economizer and a refrigeration circuit for absorbing heat energy from the air being circulated to the enclosure which comprises the steps of:

sensing the temperature of the enclosure to be conditioned;

generating a signal indicative of the difference between the desired temperature for the enclosure and the temperature sensed;

sensing ambient air conditions;

positioning the economizer damper means based on the ambient air conditions and the enclosure conditions;

energizing the fan motor at low speed when the step of positioning prevents ambient air from entering the unit; and energizing the fan motor at high speed when the step of positioning allows ambient air to enter the unit.

7. The method as set forth in claim 6 wherein the fan motor is energized at low speed during those time periods the unit may condition air to be supplied to the enclosure.

8. The method as set forth in claim 7 wherein the unit includes two refrigeration circuits each having a compressor and wherein the step of generating a signal indicative of the difference between the desired temperature for the enclosure and the temperature sensed when the unit is in the cooling mode of operation comprises the steps of:

generating a first signal upon a first difference being determined;

generating a second signal upon a second difference being determined, said second signal acting to energize the compressor of the first refrigeration circuit;

generating a third signal upon a third difference being determined, said third signal acting to energize the compressor of the second refrigeration circuit; and generating a fourth signal upon a fourth difference being determined.

9. The method as set forth in claim 8 wherein when the damper means is positioned to allow ambient air to enter the unit the fan motor is operated at high speed in response to any of the second signal, the third signal or the fourth signal.

10. The method as set forth in claim 8 wherein when the damper means is positioned to prevent ambient air to enter the unit the fan motor is operated at low speed in response to the second signal and the third signal and in high speed in response to the fourth signal.

11. Air conditioning apparatus for supplying conditioned air to an enclosure, said air conditioning apparatus including a multi-speed motor for powering the indoor fan, a refrigeration circuit and an economizer including damper means which comprises:

a thermostat located within the enclosure to be conditioned for generating a signal indicative of the temperature differential between the desired temperature and the actual temperature of the enclosure means for sensing the temperature of ambient air;

economizer control means for positioning the damper means of the economizer as a function of the enclosure temperature and ambient air temperature;

circuit means for energizing the fan motor when the refrigeration circuit of the air conditioning unit is energized to maintain the enclosure at a predetermined temperature level means for energizing the fan motor at high speed when economizer control means opens the dampers to allow ambient air into the unit; and means for overriding to energize the fan motor at high speed whenever the temperature level of the enclosure varies a predetermined amount from the desired temperature.

12. The apparatus as set forth in claim 10 and further including:

means to prevent the fan motor from being energized at high speed when the economizer control means closes the dampers preventing ambient air from entering the unit except for when said means for overriding is energized.

13. The apparatus as set forth in claim 10 wherein the means to prevent includes normally closed power exhaust relay contacts connected between a power source and the high speed fan relay, and an enthalpy control connected to energize the power exhaust relay, such that energization of the power exhaust relay through the enthalpy control caused by high ambient temperatures opens the power exhaust relay contacts preventing the fan motor from being energized at high speed regardless of the temperature of the enclosure as long as the temperature does not exceed the temperature differential to override with the means for overriding.

* * * * *